United States Patent
Yamaguchi et al.

(10) Patent No.: US 8,339,517 B2
(45) Date of Patent: Dec. 25, 2012

(54) TELEVISION BROADCAST RECEIVING APPARATUS

(75) Inventors: Hiroyuki Yamaguchi, Osaka (JP); Tsuyoshi Itaya, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 71 days.

(21) Appl. No.: 13/091,175

(22) Filed: Apr. 21, 2011

(65) Prior Publication Data
US 2011/0285907 A1 Nov. 24, 2011

(30) Foreign Application Priority Data
May 20, 2010 (JP) ................................ 2010-115905

(51) Int. Cl.
*H04N 3/24* (2006.01)
*H04N 5/60* (2006.01)
(52) U.S. Cl. ........................ 348/632; 348/738
(58) Field of Classification Search .......... 348/632–633, 348/736–738; 455/194.1, 194.2, 174.1; 381/94.5
See application file for complete search history.

(56) References Cited

U.S. PATENT DOCUMENTS

| | | | |
|---|---|---|---|
| 4,232,393 A * | 11/1980 | Kumaoka et al. | 455/154.1 |
| 5,349,699 A * | 9/1994 | Erben et al. | 455/186.1 |
| 5,363,384 A | 11/1994 | Miyoshi et al. | |
| 6,047,170 A * | 4/2000 | Paulsen et al. | 455/212 |
| 6,385,440 B1 | 5/2002 | Shimmi | |
| 7,391,823 B2 * | 6/2008 | Shibusawa | 375/316 |

FOREIGN PATENT DOCUMENTS

| | | |
|---|---|---|
| JP | 2-153638 A | 6/1990 |
| JP | 5-55917 A | 3/1993 |
| JP | 6-30358 A | 2/1994 |
| JP | 8-102686 A | 4/1996 |
| JP | 2000-49632 A | 2/2000 |
| JP | 2000-316199 A | 11/2000 |
| JP | 2007-173967 A | 7/2007 |

* cited by examiner

*Primary Examiner* — Michael Lee
(74) *Attorney, Agent, or Firm* — Birch, Stewart, Kolasch & Birch, LLP

(57) ABSTRACT

A television broadcast receiving apparatus has a demodulating unit including a PLL part synchronizing a phase of an IF signal with a phase of an internally generated carrier signal and outputting an out-of-synchronization flag signal when the IF signal and the carrier signal are in an unsynchronized state, and a muting part muting a sound intermediate frequency signal and outputting a noise signal of a predetermined level when the out-of-synchronization flag signal is outputted from the PLL part. Therefore, even when an IF amplifier of a tuning unit amplifies a noise at the maximum gain when there is no signal, an abnormal sound can be prevented from being outputted from a speaker of a decode and output unit.

4 Claims, 4 Drawing Sheets

TELEVISION BROADCAST RECEIVING APPARATUS

This nonprovisional application is based on Japanese Patent Application No. 2010-115905 filed on May 20, 2010 with the Japan Patent Office, the entire contents of which are hereby incorporated by reference.

BACKGROUND OF THE INVENTION

1. Field of the Invention

The present invention relates to a television broadcast receiving apparatus, and particularly to a television broadcast receiving apparatus capable of receiving analog broadcasting.

2. Description of the Background Art

In recent years, the shift of television broadcasting from analog broadcasting to digital broadcasting is underway worldwide. The timing of termination of analog broadcasting, however, differs between countries. Globally, the shift from analog broadcasting to digital broadcasting is expected to complete by around 2015. Therefore, at the present time, manufacturers of a television broadcast receiving apparatus manufacture and sell a receiver which allows for watching both analog broadcasting and digital broadcasting.

FIG. 4 is a block diagram showing a configuration of a conventional television broadcast receiving apparatus 500 capable of receiving analog broadcasting. In FIG. 4, television broadcast receiving apparatus 500 includes a tuning unit 200, a demodulating unit 600 and a decode and output unit 400. In the following, the operation of television broadcast receiving apparatus 500 will be described.

Tuning unit 200 has an antenna terminal 201 to which an analog broadcast signal is fed. A bandpass filter 202, an RF (Radio Frequency) amplifier 203 and a bandpass filter 205 select and amplify a desired wave channel signal of the inputted analog broadcast signal. RF amplifier 203 is a variable gain amplifier and its gain is controlled such that a suitable input signal level to a mixer 206 is obtained. A control signal for controlling the gain of RF amplifier 203 is generated by an RF AGC (Automatic Gain Control) detecting part (DET) 204 connected to an output node of bandpass filter 205.

The selected and amplified desired wave channel signal above is mixed at mixer 206 with a signal resulted from frequency dividing of a local oscillation signal of a local oscillating part 208 by a frequency dividing part (1/N) 207, and passed through a bandpass filter 209 to be turned into an IF (Intermediate Frequency) signal. The IF signal is amplified by an IF amplifier 210 such that the signal has a signal input level suitable for demodulating unit 600.

The IF signal outputted from tuning unit 200 is inputted to demodulating unit 600. In demodulating unit 600, first at a PLL (Phase Locked Loop) part 601 the phase of the IF signal is regulated such that the phase of the inputted IF signal and the phase of a carrier signal generated within PLL part 601 are in agreement. The IF signal phase regulated by PLL part 601 is supplied in parallel to a picture filter 602 and a sound filter 603.

The IF signal passed through picture filter 602 is demodulated at a video detecting part (DET) 604 into a video signal of the analog broadcast signal and transmitted via a low-pass filter (LPF) 606 to decode and output unit 400. On the other hand, the IF signal passed through sound filter 603 is demodulated at a sound intermediate frequency (SIF) detecting part (DET) 605 into a sound intermediate frequency signal, and thereafter detected by an FM (Frequency Modulation) detecting part 608 to be converted into an audio signal, and transmitted to decode and output unit 400.

It is noted that the above-described IF amplifier 210 is a variable gain amplifier, and a control signal for controlling its gain is generated by an IFAGC detecting part (DET) 211 connected to an output node of picture filter 602.

At decode and output unit 400, the video signal outputted from demodulating unit 600 is divided into a color signal and a luminance signal and converted into an RGB signal, before being displayed as a picture at a display part. The audio signal outputted from demodulating unit 600 is passed through a bandpass filter 800 before being outputted as a sound from a speaker within decode and output unit 400.

Meanwhile, as described above, the gain of IF amplifier 210 is controlled to achieve a signal level suitable for demodulating unit 600, by a control signal from IFAGC detecting part 211 based on the output signal level of picture filter 602. This results in that when an input signal to IF amplifier 210 enters a no-signal state, an output signal from picture filter 602 also enters a no-signal state, IFAGC detecting part 211 sets the gain of IF amplifier 210 at the maximum value, and IF amplifier 210 amplifies only a noise. The noise amplified by IF amplifier 210 is transmitted to sound intermediate frequency detecting part 605, which causes sound intermediate frequency detecting part 605 to output a very large noise. There has been a problem that detection of this noise by FM detecting part 608 turns the noise into a sound noise, which is outputted from a speaker of an television broadcast receiving apparatus as an abnormal sound offensive to the ear.

Countermeasures have been taken against this abnormal sound, such as imposing a special band limitation using filter 800 described in the operational description given above and muting an audio signal when it is determined at a synchronization determining circuit that synchronization is not established by a vertical synchronization signal of a video signal.

The countermeasures described above also cause some inconvenience. Specifically, although addition of filter 800 against the abnormal sound has achieved reduction of the abnormal sound due to the noise in the IF signal and provided a certain effect, increase of mounted parts in number and use of an expensive filter because of steep frequency characteristics have inhibited achieving less expensive equipment. Further, addition of a filter could not completely eliminate the abnormal sound.

In addition, as for reception of analog broadcasting, even when a smaller input signal to a receiver causes lower picture sensitivity that does not meet a practical level for watching, sound sensitivity may remain at its sufficiently practical level. The countermeasure as described above of muting a sound in response to loss of synchronization of a vertical synchronization signal at decode and output unit 400, however, has a drawback of causing no sound output even in a state in which a smaller input signal to the receiver causes somewhat disturbed synchronization of a picture, which results in lower practical sound sensitivity.

Japanese Patent Laying-Open No. 06-030358 (Patent Document 1) discloses a television sound demodulating apparatus. The apparatus is provided with means for detecting locking of respective PLL parts of a video signal synchronization system and a sound system for suppressing an unpleasant crunching noise due to variations in locking time of a PLL part of a digital sound demodulator, means for generating a mute control signal based on both of these lock signals and an output enabling signal, and means for controlling on/off of muting of an analog audio signal, a digital audio signal and a bit stream signal using the mute control signal. In turning power on/off or switching input signal, the apparatus always sets the optimum muting period, independently of variations in locking time of the PLL parts of the picture/sound systems.

Further, Japanese Patent Laying-Open No. 08-102686 (Patent Document 2) discloses a digital audio data reproducing apparatus. In this apparatus, in order to reduce a noise which is offensive to the ear and generated when clock synchronization cannot be established, when data synchronization cannot be established, and when data error is detected, a PLL circuit, a synchronization detection circuit and an error correction circuit supply clock unlock signal, a loss of synchronization signal and a data error detection signal, respectively, to a mute signal weighting circuit, a mute signal corresponding to each of the signals is outputted to an output control circuit, and the output control circuit control output of audio data according to the mute signal.

In Patent Document 1, however, the picture system and the sound system are provided with respective PLL parts, and the sound mute control signal is generated based on the lock signals of the respective PLL parts and the output enabling signal for controlling the timing and period of outputting an audio signal. Therefore, the circuit configuration and control of the signals is rather complex and not suitable for achieving less expensive apparatus. In addition, it cannot be said that consideration is given to a sound mute operation in the case of increased or decreased input signal level to the apparatus.

In Patent Document 2, when the carrier to noise ratio (C/N) degrades due to conditions of an input signal level to the apparatus, causing the PLL part to lose phase synchronization and to enter a clock unlocked state, a mute signal is immediately supplied from the mute signal weighting circuit to the output control circuit to mute audio data and set output of audio data zero. In this case, although noise reduction can be effectively achieved, setting output of audio data zero depending on the condition of reception makes occurrence of no-sound state unavoidable, and therefore, an abrupt break in a sound is experienced in the vicinity of the reception limit.

SUMMARY OF THE INVENTION

Therefore, a main object of the present invention is to provide a low-cost television broadcast receiving apparatus having high practical sound sensitivity.

The television broadcast receiving apparatus according to the present invention includes a tuning unit converting an inputted television broadcast signal into an intermediate frequency signal and a demodulating unit demodulating the intermediate frequency signal. The demodulating unit includes a phase synchronization loop part synchronizing a phase of the intermediate frequency signal with a phase of an internally generated carrier signal, outputting a synchronization flag signal when the intermediate frequency signal and the carrier signal are in a synchronized state, and outputting an out-of-synchronization flag signal when the intermediate frequency signal and the carrier signal are in an unsynchronized state, a video detecting part demodulating the intermediate frequency signal outputted from the phase synchronization loop part into a video signal, and a sound detecting part demodulating the intermediate frequency signal outputted from the phase synchronization loop part into an audio signal when the synchronization flag signal is outputted from the phase synchronization loop part, and outputting a noise signal of a predetermined level instead of the audio signal when the out-of-synchronization flag signal is outputted from the phase synchronization loop part.

Preferably, the sound detecting part includes a sound intermediate frequency demodulating part demodulating the intermediate frequency signal outputted from the phase synchronization loop part into a sound intermediate frequency signal, a muting part receiving the sound intermediate frequency signal into which said intermediate frequency signal is demodulated by the sound intermediate frequency demodulating part, allowing the sound intermediate frequency signal to pass through when the synchronization flag signal is outputted from the phase synchronization loop part, and muting the sound intermediate frequency signal and outputting a noise signal of a predetermined level when the out-of-synchronization flag signal is outputted from the phase synchronization loop part, and an FM detecting part converting an output signal of the muting part into the audio signal.

More preferably, the muting part includes a noise generating portion generating the noise signal when the out-of-synchronization flag signal is outputted from the phase synchronization loop part, and stopping generation of the noise signal when the synchronization flag signal is outputted from the phase synchronization loop part.

More preferably, the noise generating portion includes a random bit generator generating a sequence of random bits and a D/A converter performing D/A conversion of the sequence of random bits to generate the noise signal.

Effects of the Invention

According to the present invention, in response to an out-of-synchronization flag signal from a phase synchronization loop part, a sound detecting part outputs a noise signal of a predetermined level instead of an audio signal, thereby achieving muting of a sound concurrently with complete loss of picture for viewing. In addition, because the noise signal causes a natural noise sound to be outputted, an abrupt break in a sound can be avoided. Therefore, enhanced practical sound sensitivity can be achieved at low cost.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
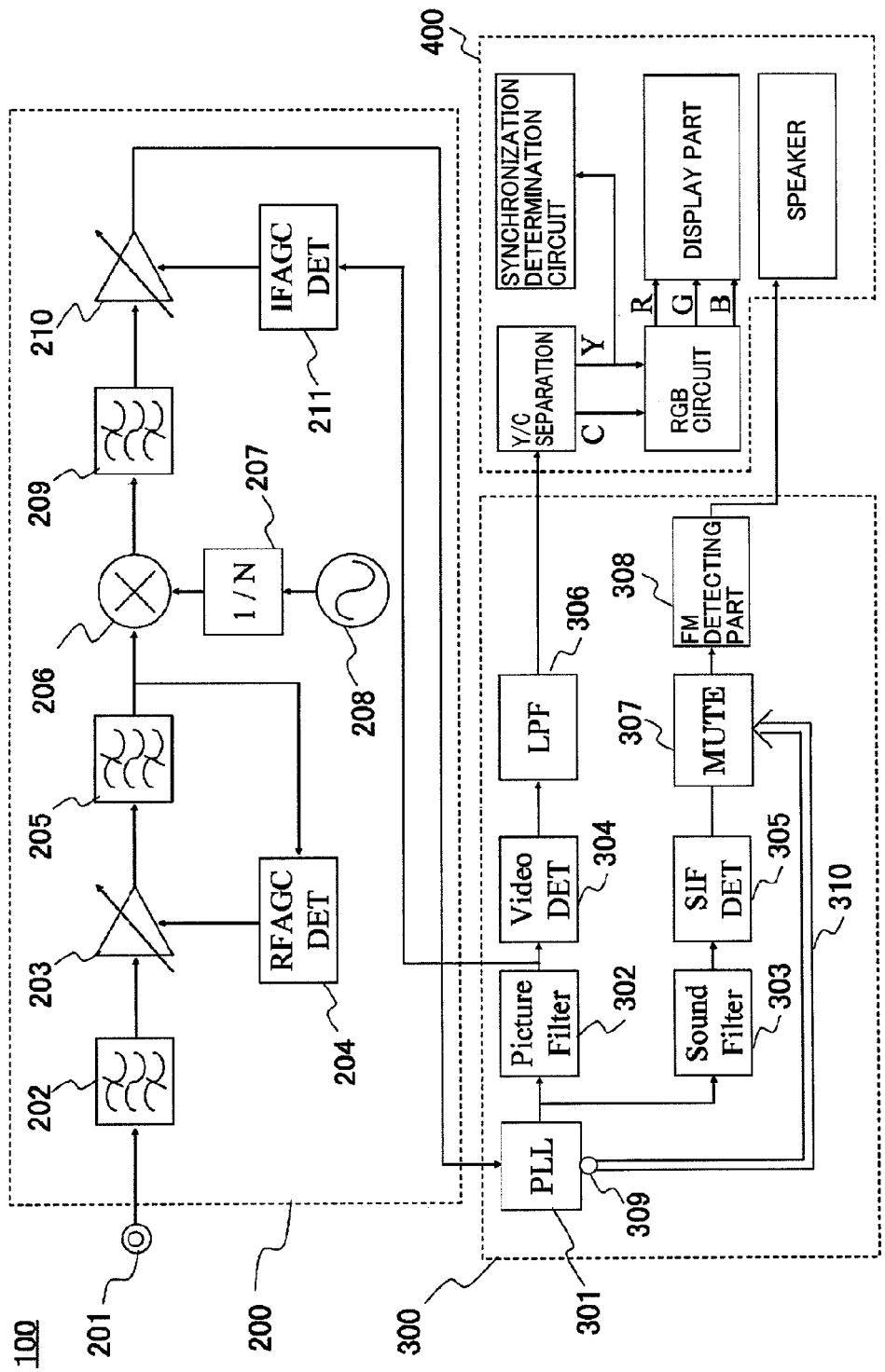
FIG. 1 is a block diagram showing a television broadcast receiving apparatus according to one embodiment of the present invention.
Figure 4:
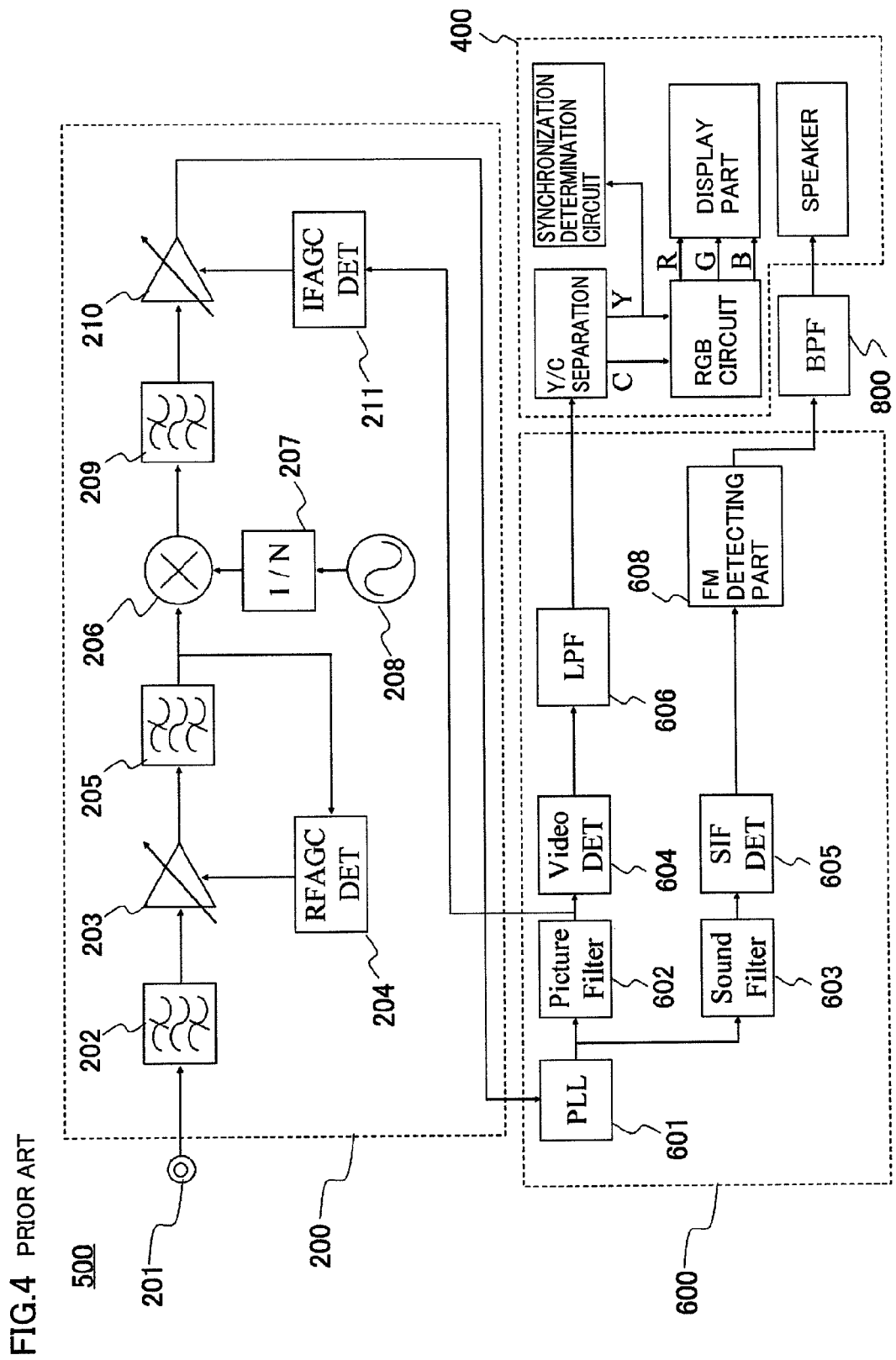
FIG. 4 is a block diagram showing a configuration of a conventional television broadcast receiving apparatus.

A television broadcast receiving apparatus 100 according to one embodiment of the present invention includes a tuning unit 200, a demodulating unit 300 and a decode and output unit 400, as shown in FIG. 1. It is noted that the configuration and operation of tuning unit 200 are the same as those of the tuning unit shown in FIG. 4, and a description thereof will not be repeated. Description will be given of a process in which an IF signal is outputted from tuning unit 200 and processed at demodulating unit 300 to be converted into a video signal and an audio signal which are demodulated signals.

An IF signal outputted from tuning unit 200 is inputted to a PLL part 301 of demodulating unit 300. PLL part 301 regulates the phase of the IF signal such that the phase of the IF signal and the phase of a carrier signal generated within PLL part 301 are in agreement. PLL part 301 has a mute control terminal 309. The IF signal phase regulated by PLL part 301 is supplied in parallel to a picture filter 302 and a sound filter 303.

The IF signal passed through picture filter 302 is demodulated at a video detecting part (DET) 304 into a video signal of a television broadcast signal, and transmitted through a low-pass filter (LPF) 306 to decode and output unit 400. On the other hand, the IF signal passed through sound filter 303 is demodulated at a sound intermediate frequency (SIF) detecting part (DET) 305 into a sound intermediate frequency signal before being supplied via a muting part 307 to an FM detecting part 308. Muting part 307 is controlled by a flag signal from mute control terminal 309 of PLL part 301. Muting part 307 outputs a signal, which is detected by FM detecting part 308 to be converted into an audio signal and transmitted to decode and output unit 400.

It is noted that tuning unit 200 has an IF amplifier 210, which is a variable gain amplifier, and a control signal for controlling its gain is generated by an IFAGC detecting part 211 connected to an output node of picture filter 302.

Here, when an input signal level to IF amplifier 210 enters a no-signal state, the output signal of demodulating unit 300 to PLL part 301 is only a noise generated at IF amplifier 210. This causes PLL part 301 to be unable to achieve phase synchronization between the IF signal and the internally generated carrier signal and PLL part 301 to output an out-of-synchronization flag signal from mute control terminal 309. The outputted out-of-synchronization flag signal is transmitted via a bus 310 to muting part 307.

In response to the transmitted out-of-synchronization flag signal, muting part 307 mutes transmission of a noise from sound intermediate frequency detecting part 305 to FM detecting part 308, and transmits a noise signal of a certain level generated within muting part 307 to FM detecting part 308. FM detecting part 308 transmits the noise signal transmitted from muting part 307 to decode and output unit 400, and the transmitted noise signal is outputted from a speaker as a natural noise sound.

It is noted that when an input signal level to IF amplifier 210 reaches an input signal level which can be phase synchronized by PLL part 301, PLL part 301 outputs a synchronization flag signal from mute control terminal 309 via bus 310 to muting part 307. In response to the synchronization flag signal, muting part 307 transmits a demodulated output signal of sound intermediate frequency detecting part 305 to FM detecting part 308.

In the present embodiment, in a sound demodulation process at demodulating unit 300, when phase synchronization at PLL part 301 enters an unsynchronized state, PLL part 301 outputs the out-of-synchronization flag signal. In response to the out-of-synchronization flag signal, muting part 307 mutes a noise transmitted from sound intermediate frequency detecting part 305 to FM detecting part 308 and transmits a noise signal of a certain amount generated within muting part 307 to FM detecting part 308. Therefore, even when an input signal to IF amplifier 210 enters the no-signal state and feedback from output of picture filter 302 cause IF amplifier 210 to amplify a noise at the maximum gain, the above-described operation of muting part 307 prevents the amplified noise from being transmitted to FM detecting part 308. Generation of an abnormal noise outputted from a speaker and offensive to the ear, which is caused by transmission of an increased noise of IF amplifier 210 in the no-signal state, can thereby be avoided.

Further, output of a sound is maintained while phase synchronization at PLL part 301 retains a synchronized state, that is, while a video signal is outputted, and therefore, enhanced practical sound sensitivity can be achieved.

Furthermore, when phase synchronization at PLL part 301 is in the out-of-synchronization state, the noise signal of a certain level generated within muting part 307 is transmitted to FM detecting part 308, and the noise signal is outputted from a speaker within decode and output unit 400 as a natural noise sound. An abrupt break in a sound can thereby be avoided.

Figure 2:
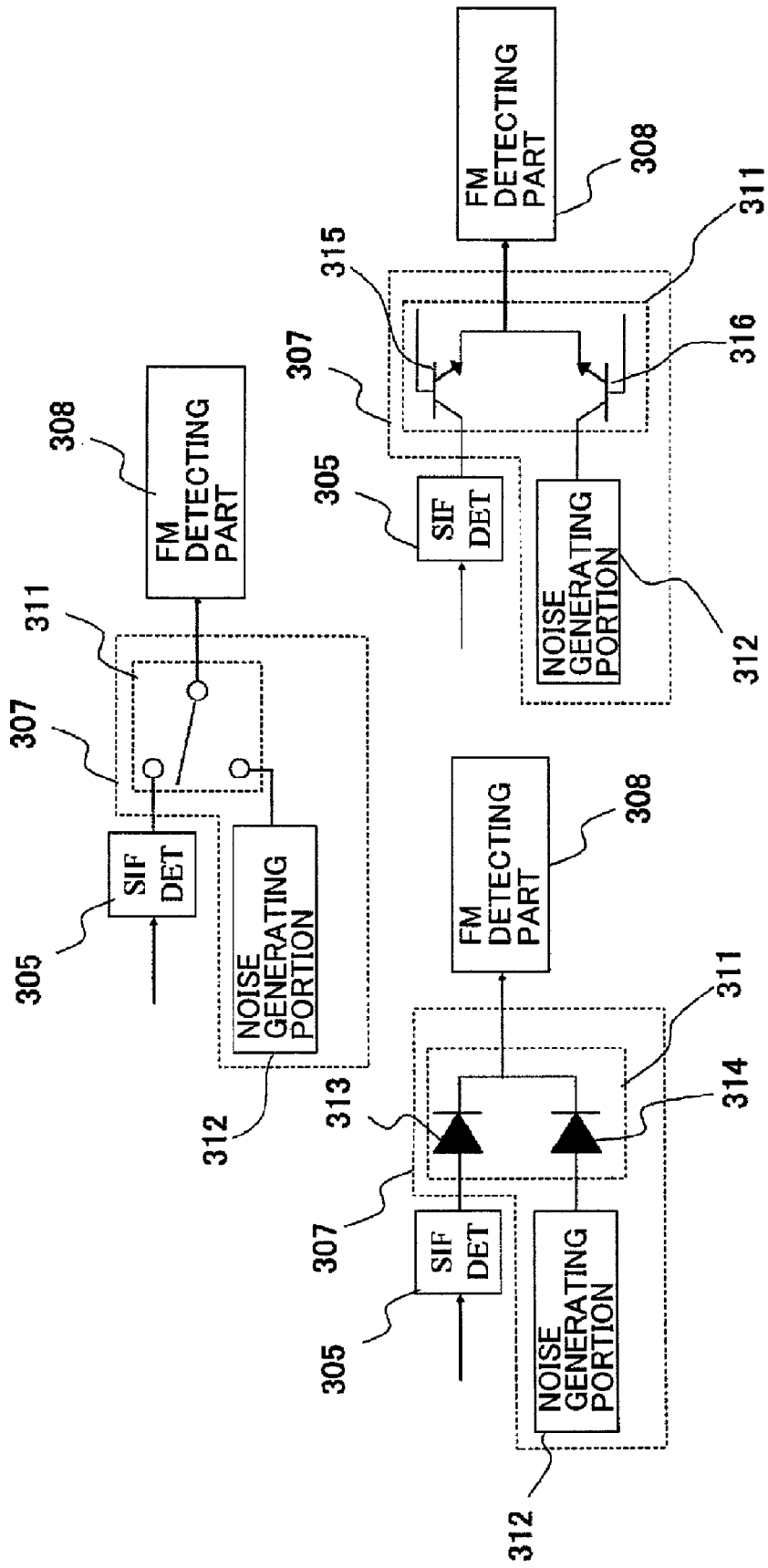
FIGS. 2A to 2C are circuit block diagrams showing configurations of a muting part shown in FIG. 1.

Next, specific examples of muting part 307 will be described with reference to FIGS. 2A to 2C. FIG. 2A shows a basic configuration of muting part 307. Muting part 307 includes a switching portion 311 and a noise generating portion 312. Switching portion 311 connects sound intermediate frequency detecting part 305 and FM detecting part 308 when phase synchronization in PLL part 301 of FIG. 1 enters the synchronized state and the synchronization flag signal is being outputted from mute control terminal 309. Switching portion 311 also connects noise generating portion 312 and FM detecting part 308 when input to IF amplifier 210 of FIG. 1 enters the no-signal state and the out-of-synchronization flag signal is outputted from mute control terminal 309.

Noise generating portion 312 is driven in a timed manner with respect to switching with sound intermediate frequency detecting part 305, and generates a noise signal of a certain level. It is noted that although not shown in the drawings, as a control signal for driving noise generating portion 312, the above-described flag signal from mute control terminal 309 can be used. In this case, noise generating portion 312 generates a noise signal when the out-of-synchronization flag signal is outputted form PLL part 301, and stops generation of a noise signal when the synchronization flag signal is outputted from PLL part 301. Further, noise generating portion 312 may be driven all the time when sufficient isolation of switching portion 311 can be ensured.

Switching portion 311 of FIG. 2A can be implemented with two diodes 313, 314, as shown in FIG. 2B. Diode 313 is connected between sound intermediate frequency detecting part 305 and FM detecting part 308. Diode 314 is connected between noise generating portion 312 and FM detecting part 308. When phase synchronization of PLL part 301 of FIG. 1 is in the synchronized state, diode 313 is turned on and diode 314 is turned off, so that sound intermediate frequency detecting part 305 and FM detecting part 308 are connected to each other. On the other hand, when input to IF amplifier 210 of FIG. 1 enters the no-signal state causing PLL part 301 to enter the unsynchronized state and the out-of-synchronization flag signal is outputted from mute control terminal 309, diode 314 is turned on and diode 313 is turned off, so that noise generating portion 312 and FM detecting part 308 are connected to each other.

Further, as shown in FIG. 2C, transistors 315, 316 may be substituted for diodes 313, 314 of FIG. 2B, respectively. The operation of switching portion 311 of FIG. 2C is the same as that of switching portion 311 of FIG. 2B, and a description thereof will not be repeated.

Figure 3:
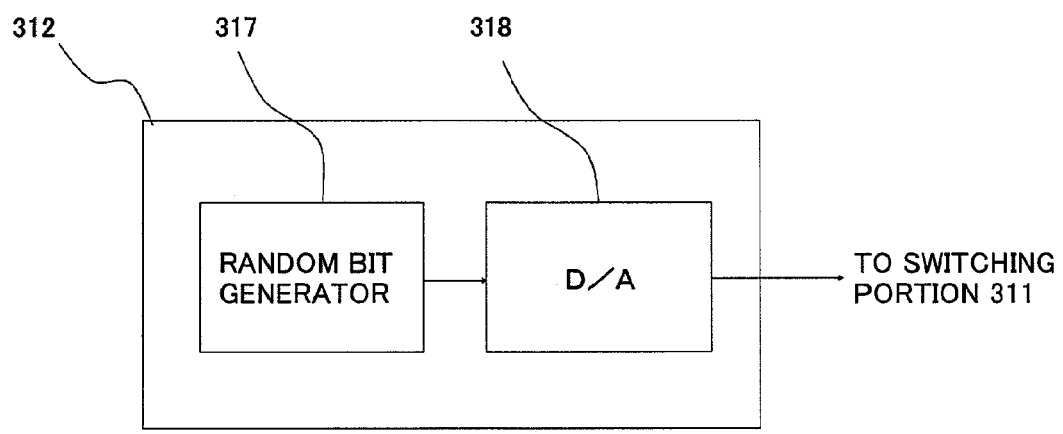
FIG. 3 is a block diagram showing a configuration of a noise generating portion shown in FIGS. 2A to 2C.

Next, a specific example of noise generating portion 312 shown in FIGS. 2A to 2C will be described with reference to FIG. 3. In FIG. 3, noise generating portion 312 includes a random bit generator 317 and a D/A (Digital/Analog) converter 318. First, random bit generator 317 generates a sequence of random bits made of binarized random numbers (a data signal sequence of a plurality of bits). The generated sequence of random bits is inputted to D/A converter 318 and converted into an analog signal. This converted analog signal is a white noise, which is transmitted via switching portion 311 to FM detecting part 308 of FIGS. 1 and 2A to 2C.

It is noted that as for means for generating a white noise, other than the above-described one example, it is possible, for example, to utilize avalanche breakdown of a Zener diode to generate a white noise.

The present invention can be widely applied to a television broadcast receiving apparatus capable of receiving analog broadcasting. In particular, the present invention is suitable for reception of analog broadcasting in an area having difficulty in receiving broadcasting and by a movable body.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A television broadcast receiving apparatus, comprising:
   a tuning unit converting an inputted television broadcast signal into an intermediate frequency signal; and
   a demodulating unit demodulating said intermediate frequency signal,
   said demodulating unit including:
      a phase synchronization loop part synchronizing a phase of said intermediate frequency signal with a phase of an internally generated carrier signal, outputting a synchronization flag signal when said intermediate frequency signal and said carrier signal are in a synchronized state, and outputting an out-of-synchronization flag signal when said intermediate frequency signal and said carrier signal are in an unsynchronized state;
      a video detecting part demodulating said intermediate frequency signal outputted from said phase synchronization loop part into a video signal; and
      a sound detecting part demodulating said intermediate frequency signal outputted from said phase synchronization loop part into an audio signal when said synchronization flag signal is outputted from said phase synchronization loop part, and outputting a noise signal of a predetermined level instead of said audio signal when said out-of-synchronization flag signal is outputted from said phase synchronization loop part.

2. The television broadcast receiving apparatus according to claim 1, wherein
   said sound detecting part includes:
      a sound intermediate frequency demodulating part demodulating said intermediate frequency signal outputted from said phase synchronization loop part into a sound intermediate frequency signal;
      a muting part receiving said sound intermediate frequency signal into which said intermediate frequency signal is demodulated by said sound intermediate frequency demodulating part, allowing said sound intermediate frequency signal to pass through when said synchronization flag signal is outputted from said phase synchronization loop part, and muting said sound intermediate frequency signal and outputting a noise signal of a predetermined level when said out-of-synchronization flag signal is outputted from said phase synchronization loop part; and
      an FM detecting part converting an output signal of said muting part into said audio signal.

3. The television broadcast receiving apparatus according to claim 2, wherein
   said muting part includes a noise generating portion generating said noise signal when said out-of-synchronization flag signal is outputted from said phase synchronization loop part, and stopping generation of said noise signal when said synchronization flag signal is outputted from said phase synchronization loop part.

4. The television broadcast receiving apparatus according to claim 3, wherein
   said noise generating portion includes:
      a random bit generator generating a sequence of random bits; and
      a D/A converter performing D/A conversion of said sequence of random bits to generate said noise signal.

* * * * *